April 4, 1950          H. C. NOE          2,502,475
FILM SCRAPING DEVICE FOR FILM SPLICERS
Filed Jan. 3, 1946          2 Sheets-Sheet 1
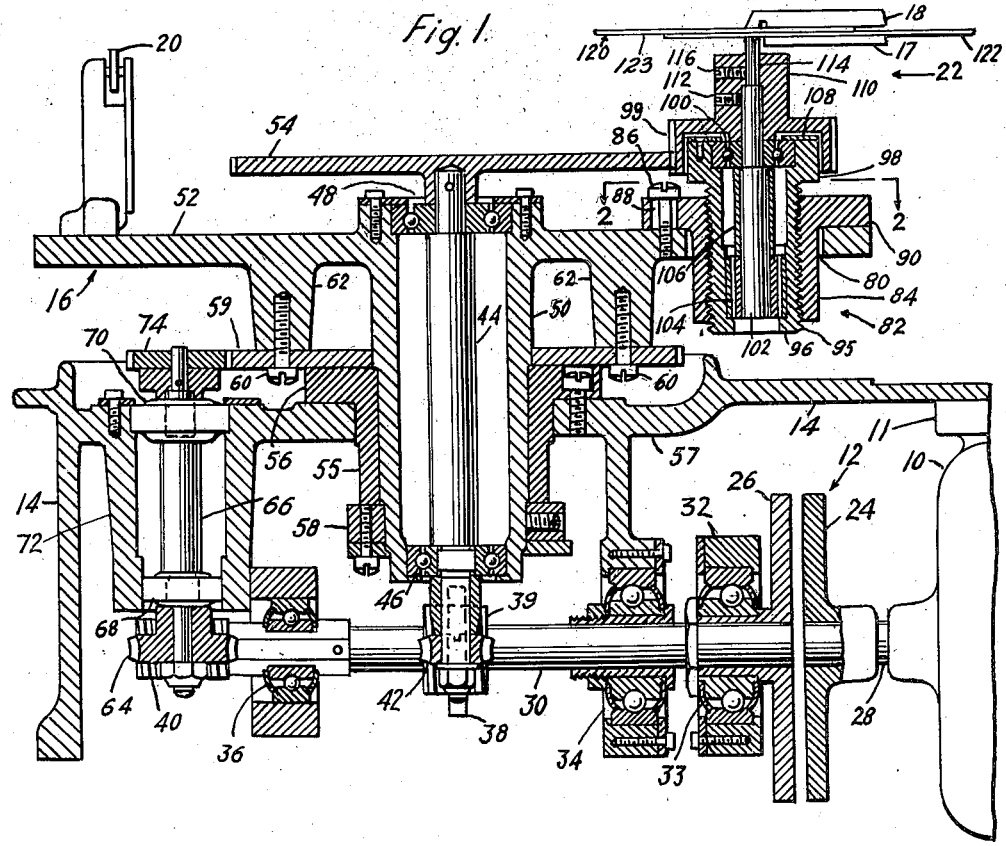
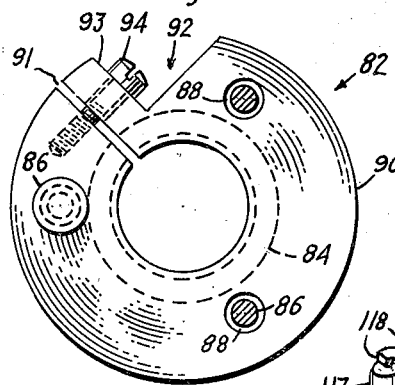
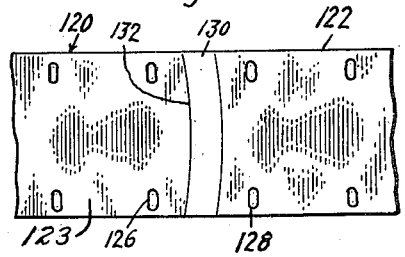
INVENTOR.
HAROLD C. NOE
BY
J. William Carson
ATTORNEY April 4, 1950  H. C. NOE  2,502,475
FILM SCRAPING DEVICE FOR FILM SPLICERS
Filed Jan. 3, 1946  2 Sheets-Sheet 2
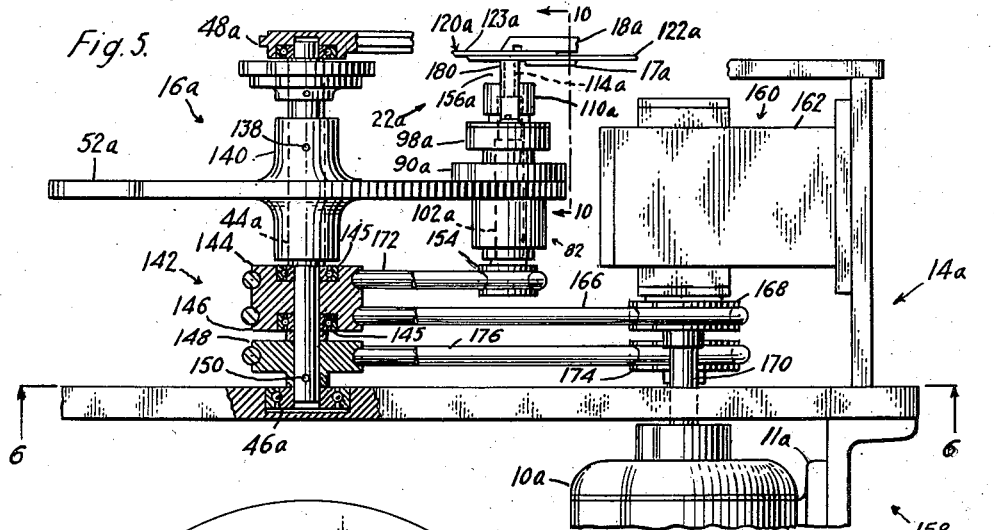
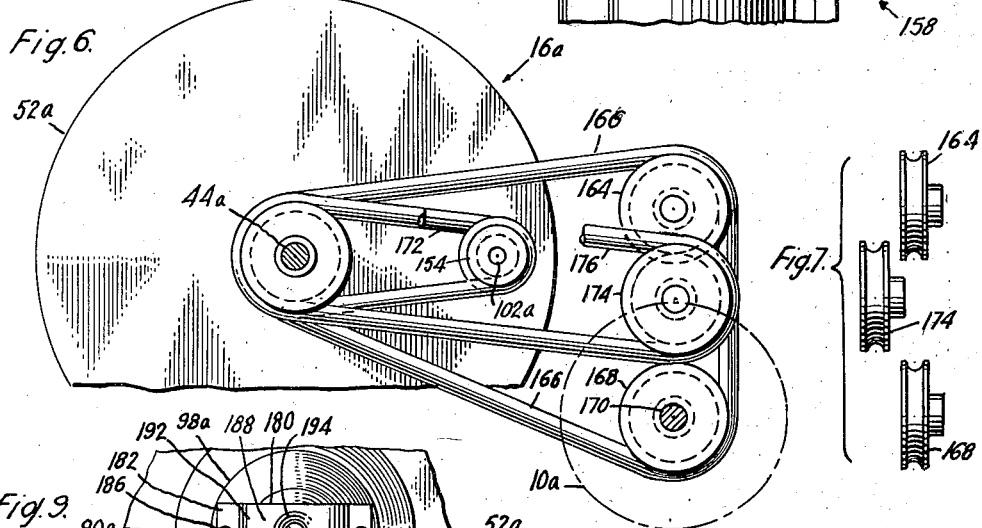
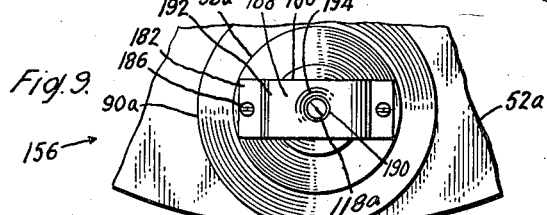
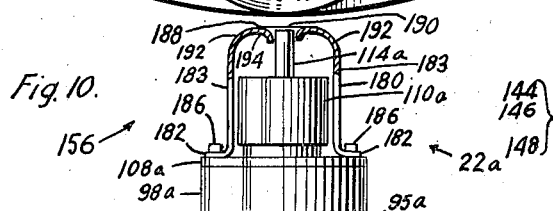
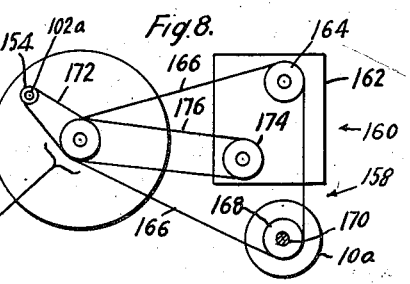
INVENTOR
HAROLD C. NOE
BY
J. William Carson
ATTORNEY Patented Apr. 4, 1950

2,502,475

UNITED STATES PATENT OFFICE 2,502,475

FILM SCRAPING DEVICE FOR FILM SPLICERS

Harold C. Noe, Upper Montclair, N. J., assignor to Bloomfield Tool Corporation, Bloomfield, N. J., a corporation of New Jersey Application January 3, 1946, Serial No 638,716

2 Claims. (Cl. 15—93)

This invention relates to motion picture film splicers, and particularly to means for removing the emulsion and a surface portion of the film preparatory to splicing film sections.

An object of the present invention is to provide a film scraper wherein a novel arrangement and movement of parts produce a better film emulsion removing and scraping effect.

Another object is to facilitate the making of splices of the above-indicated character.

Another object is to provide a device or machine of the above-indicated character which comprises few parts, is quiet in operation, and is adapted to hold a film in effective relation to film backing means for scraping.

Another object is to provide a film scraping device which renders a splicing machine more compact and better adapted to easy manipulation by less skilled operators.

Another object is to provide a mechanism in which a table and an abrading element are rotated in a novel and improved manner from driving or speed-reducing means.

A further object is to provide a film abrading or scraping device for a splicing machine that is simple and durable in construction, economical to manufacture and effective in its operation.

Further objects, not specifically enumerated above, will be apparent as the invention is described in greater detail in connection with the accompanying drawings, wherein:

Figure 1 is a side view, generally in section, of a portion of a machine constructed in accordance with the invention.

Figure 2 is a top plan view of a sleeve element of the machine, as viewed in the plane of line 2—2 of Figure 1, screws being shown in section and elevation.

Figure 3 is a plan view of a portion of a film as spliced by the machine of the invention.

Figure 4 is a perspective view of a scraper embodied in the invention.

Figure 5 shows a modification of the invention as viewed in the direction of Figure 1, but being generally in elevation.

Figure 6 is a bottom plan view, taken substantially along the line 6—6 of Figure 5; parts having been omitted.

Figure 7 is a view taken from the right of Figure 6, showing only certain pulleys thereof.

Figure 8 is an outline diagram of parts of Figure 6, generally as viewed therein, but with the parts rearranged.

Figure 9 is an enlarged fragmentary top plan view of film holding or pressing means of the invention.

Figure 10 is a side elevation of the means shown in Figure 9 partly in section, substantially as viewed in the plane of the line 10—10 of Figure 5.

Referring to Figure 1, the machine as therein shown comprises, in general, driving means such as a motor 10, a clutch 12, a supporting means or frame 14 on which a frame or support portion 11 of the motor 10 is mounted, a turntable structure 16, a film rest or support 17, a film backing means or plate 18, a film cutter 20, and film abrading or emulsion removing means 22. Only a portion of the support 17 and the plate 18 are shown, which may be elements of a film holder, such as shown in my Patent No. 2,414,481, suitably supported by the top of a housing (not shown) for the machine described herein.

The clutch 12 comprises friction discs 24 and 26 fixed to a shaft 28 of the motor 10 and to a main drive shaft 30, respectively, and normally spaced from each other in disengaged positions as shown. A collar 32, mounted on a side sleeve of the disc 26, as through a ball bearing 33, is normally spring biased by means (not shown) to hold the discs 24 and 26 apart, and is adapted for movement parallel to the shafts for effecting engagement of the discs.

The main drive shaft 30 is journaled, as by ball bearings 34 and 36 supported by the frame 14, and carries a worm screw 38 having a sleeve 39 fixed to the shaft 30 intermediate the bearings 34 and 36, and a worm screw 40 at the left end thereof, as shown in Figure 1.

The worm screw 38 meshes with a worm wheel 42 secured to a shaft 44, which is journaled in lower and upper ball bearings 46 and 48, respectively, positioned in a sleeve 50 constituting a part of, and depending from, a table portion proper 52 of the turntable structure 16. The shaft 44 carries a large gear 54 adjacent to its upper end, as shown. The sleeve 50 is rotatably mounted in a bearing sleeve 55 having a flange 56 resting on and bolted to an upper part 57 of the frame 14, and is maintained in position at its lower end, as by holding ring means 58. A gear 59, of relatively large diameter, is rotatively mounted on the flange 56 and is secured to the underside of the table portion 52, by screws 60 threaded into bosses 62 depending from the table portion 52.

The worm screw 40, at the left end of the main drive shaft 30, meshes with a worm wheel 64 fixed to a shaft 66 which is journaled in lower and upper ball bearings 68 and 70, respectively, in a tubular portion or sleeve 72 of the frame 14 and carries a pinion 74 meshing with the gear 59.

The table portion 52 has an aperture 80 extending therethrough, adjacent its outer periphery and located a substantial distance radially from the axis of the shaft 44, for the purpose about to be described, for receiving a sleeve 82 of the film emulsion removing means or device 22 of the illustrative embodiment.

The sleeve 82 (Figures 1 and 2) has a tubular body portion 84 of substantially smaller outside diameter than the diameter of the aperture 80 whereby the sleeve 82 may be adjusted radially on the table portion 52 relative to the shaft 44 and fixed in adjusted position by screws 86 extending through openings 88 in a flange 90 of the sleeve 82 resting on the table portion 52. The openings 88 are also of larger diameter than the bodies of the screws 86, but of smaller diameter than the screw heads, so that the screws effectively clamp the sleeve 82 in any position to which it is adjusted. The sleeve 82, as seen in Fig. 2, has a radial split 91 extending longitudinally throughout its body 84 and flange 90, and a cutout 92 in the flange 90 providing a shoulder 93 for the head of a screw 94 spanning the split 91.

The sleeve 82 is internally screw threaded to receive a cooperatively threaded vertically adjustable bushing 95 having a lower inwardly extending end flange 96, and an upper outwardly extending end flange 98 having a recess in which a ball bearing 100 is provided for a shaft 102. By turning the screw 94, Figure 2, the sleeve 82 is clamped against the bushing 95 to lock the threads of the sleeve and the bushing to each other. A needle bearing 104, on the lower end flange 96, surrounds the shaft 102 and supports a sleeve 106 which supports the inner race of the ball bearing 100, and a plate or disc 108 holds the bearing 100 in the flange 98.

A tool holder 110, having a pinion portion 99 about the flange 98 for engagement with the gear wheel 54, is detachably secured to the shaft 102, as by a set screw 112 engaging a dent or flat spot of the shaft 102, and is adapted to receive any one of a selection of end mill type scrapers 114 detachably secured to the holder as by a set screw 116.

As indicated in Figure 4, the scraper 114 has a flat side portion 115 for cooperation with the set screw 116, and a head end 117 having only two cutting edges 118, this feature being possible by reason of the very high speed of rotation of the scraper, although other scrapers may be employed.

The radial adjustment of the end mill 114 relative to the shaft 44 above set forth is for determining the position of the cut, that is, the portion of the film to be scraped, and the axial adjustment of the end mill normal to the plane of the cut is for determining the thickness of the cut or the quantity of emulsion removed.

The film holder 18 or its equivalent may be of a type heretofore employed, the details of which do not constitute part of this invention, and is essential to the extent that it is required to hold or act as backing means for film sections 122 and 123 over the section 122 in the overlapping end-to-end relation shown.

In operation, referring to Figure 3, the sections 122 and 123 of the film 120 are first arranged manually so that, when clamped in the relation indicated in Figure 1 with the section 123 over the section 122, adjacent sprocket pin holes 126 and 128 of the respective sections will be properly spaced relative to each other and to the sprocket, after subsequent cutting and lapping operations hereinafter set forth.

The disc 26 of the clutch 12 is caused to engage the disc 24 whereby the shaft 30 is rotated to transmit its motion to the shafts 66 and 44 which, in turn, operate through the pinion 74 and the gear wheel 59, and the gear wheel 54 and the pinion 99, respectively, to rotate the turntable 16 at a slow speed, such as from fourteen to seventeen revolutions per minute, while the scraper rotates at a much higher speed.

The resultant action is one in which the scraper 114 rotates at high speed about one axis, namely the axis of the shaft 102, and revolves at slow speed about another axis parallel thereto, namely the axis of the shaft 44, whereby the scraper gradually approaches the underside of the edge of the film and the cutting edges of the scraper are so rapidly swept along this film edge, first striking the film edge at a point tangent to the scraper and then gradually cutting into the film edge, so that buckling, crinkling or cracking of the film are completely avoided, and a smooth, easy, uniform cut is effected across the film to form an area 130 from which the film emulsion has been removed.

Immediately following this action, the film sections are moved apart by a distance equal to the width of the area 130, the cutter 20 severs both film sections along a line 132, cement is applied to the scraped area 130, the end of the film section 123 is then moved under the end of the film section 122 in proper registry, and the film ends are pressed together to complete the splice. The entire trimming, scraping, cementing and lapping operations are effected by the machine in about four seconds.

Referring to Figures 5, 6, 7 and 8, in which similar parts are designated by corresponding reference numerals having the suffix "a," the film abrading means 22 remains substantially the same as in Figure 1, and the device is otherwise greatly simplified by the elimination of the clutch 12, the pinions 74 and 99, the gear wheels 54 and 59, the worm wheels 42 and 64, the worm screws 38 and 40, and the simplification of the frame 14.

A shaft 44a of a turntable structure 16a is journaled in an upper anti-friction bearing 48a and in a similar lower bearing 46a in portions of supporting means 14a. A table portion proper 52a of a turntable structure 16a is fixed to the shaft 44a, as by a pin 138 through the shaft and through a sleeve portion 140 of the table 52a. A unit 142 consisting of a pair of pulleys 144 and 146 integrally joined or secured to each other, is disposed on the shaft 44a in rotatable relation to the shaft as through ball bearings 145, and maintained between the sleeve 140 and a plate of the frame 14a by a pulley 148 that is fixed to the shaft 44a, as by a pin 150.

A film abrading or emulsion removing means 22a is similar to the means 22 of Figure 1, except that the pinion portion 99 of the means 22 is omitted, and replaced by a pulley 154 secured to the lower end of a shaft 102a. The means 22a is adapted to carry a device 156, as better shown in Figures 9 and 10 and to be further described herein, for pressing a film section 123a against a backing plate 18a, and which, with slight modification, is also adapted for similar action in the device of Figure 1.

Driving means 158 includes speed-change or gear-reduction unit 160, Figure 5, having a support or casing means 162 mounted on the supporting means 14a. A primary or high-speed pulley 164, Figures 6, 7, and 8, linked by a friction belt 166 with a pulley 168 on a shaft 170 of a motor 10a having a frame or support 11a mounted on the means 14a. The belt 166 also links the pulley 164 with the pulley 146 on the turntable shaft 44a. A belt 172 links the pulley 144 with the pulley 154. An output or slow speed pulley 174 of the speed-change unit 160, is connected, by a belt 176 to the pulley 148 on the turntable shaft 44a.

Referring to Figures 9 and 10, in which similar parts to those of Figure 1 are also designated by corresponding reference numerals having the suffix "a," the device 156 comprises a resilient element 180 of inverted substantially U-shape having feet 182 extending laterally outwardly from legs 183 thereof and secured to the flange 98a, as by screws 186.

The top surface of a closed end 188 of the element 180, which lies in a plane just above the cutting edges of the end mill 114a, has an aperture 190 surrounding the edges 118a (Figure 9), and merges into the outer surfaces of the legs 183 through curved surfaces 192. An edge 194 about the aperture 190 is rounded, as by being bent inwardly and downwardly to extend about the upper portion of the end mill 114a, as shown in Figure 10.

In the operation of the device of Figures 5, 6 and 7, which is generally the same as that of the device of Figure 1, before the end mill 114a, in the movement thereof about the axis of the table 52a, reaches the film, the film section 123a has a tendency to sag away from the backing plate 18a.

To compensate for such sag, as the end mill 114a approaches the film, the leading curved surface 192 of the resilient element 180 first gradually presses the film upward against the backing plate 18a for holding the film in tightly held flat engagement with the plates by the closed end 188, in doing which, the top surface of the element 180 is depressed so that the portion of the end mill adjacent the cutting edge 118a is guided through the aperture 190 for effective abrading operation of the film throughout the cut.

From the foregoing description, it will be seen that means of novel construction and operation have been provided for more rapidly and economically splicing films, in which the film abrading means bodily revolves relative to the driving means about the turntable axis while rotating about its own axis, is which novel means is provided whereby the axes of the turntable and the abrading means may be parallel, in which the cutting action is improved, and in which other advantages such as reduction in the number and simplification of the parts, and quiet operation are obtained, to render the invention a substantial advance in its field.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a film splicing machine including a backing plate for the film, the combination of an end mill having an end portion for engaging the surface of the film to abrade the same, means for rotating said mill about its axis, means for revolving the mill in a path across the film, and yieldable means adjacent said mill and carried by said revolving means for engaging the film and holding the same against the backing plate while said mill is effective to abrade the film.

2. In a film splicing machine including a support for the film to be spliced and a backing plate for the film, the combination of a rotary table beneath the support, a yieldable member on said table positioned for engaging the film and holding the same against the backing plate, said member having an opening therein facing the underside of the film, an end mill mounted for rotation on said table in an upright position and having an upper end portion positioned to extend through said opening and engage the surface of the film at the underside thereof to abrade the same, means for rotating said end mill and means for rotating said table whereby said end mill is revolved in a path across the film while abrading the same.

HAROLD C. NOE.

REFERENCES CITED

The following references are of record in the file of this patent:

UNITED STATES PATENTS

| Number | Name | Date |
|---|---|---|
| 396,987 | Corliss | Jan. 29, 1889 |
| 795,082 | Warner | July 18, 1905 |
| 936,842 | Wilson | Oct. 12, 1909 |
| 1,064,930 | Prindle | June 17, 1913 |
| 1,421,030 | Rose | June 27, 1922 |
| 1,460,525 | Wickland | July 31, 1923 |
| 1,471,864 | Sentou et al. | Oct. 23, 1923 |
| 1,511,213 | Arnold | Oct. 14, 1924 |
| 1,560,584 | Klaffki | Nov. 10, 1925 |
| 1,656,665 | DeHuff | Jan. 17, 1928 |
| 1,734,140 | McLaughlin et al. | Nov. 5, 1929 |
| 2,146,639 | Magnuson | Feb. 7, 1939 |
| 2,245,976 | Griswold | June 17, 1941 |
| 2,258,356 | Goldberg | Oct. 7, 1941 |
| 2,328,447 | Geyer | Aug. 31, 1943 |